United States Patent
Maheshwari

(10) Patent No.: US 12,014,228 B2
(45) Date of Patent: *Jun. 18, 2024

(54) METHOD AND APPARATUS FOR GENERATING WHITE UNDERBASE AND GENERATING MODIFIED SEPARATIONS FOR PRINTING ON COLORED BACKGROUND OTHER THAN BLACK AND WHITE

(71) Applicant: Sanjay Chandramohan Maheshwari, Surat (IN)

(72) Inventor: Sanjay Chandramohan Maheshwari, Surat (IN)

(73) Assignee: KOTHARI INFO-TECH PVT. LIMITED, Pin (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,300

(22) Filed: Feb. 23, 2023

(65) Prior Publication Data

US 2023/0196047 A1    Jun. 22, 2023

Related U.S. Application Data

(63) Continuation of application No. 16/968,344, filed as application No. PCT/IN2018/050750 on Nov. 14, 2018, now Pat. No. 11,593,600.

(30) Foreign Application Priority Data

Nov. 14, 2017  (IN) .............................. 201721032620

(51) Int. Cl.
 G06K 15/02  (2006.01)
 G06F 3/12  (2006.01)
 H04N 1/60  (2006.01)

(52) U.S. Cl.
 CPC ....... *G06K 15/1868* (2013.01); *G06F 3/1208* (2013.01); *G06K 15/1878* (2013.01); *H04N 1/60* (2013.01)

(58) Field of Classification Search
 CPC ............ G06K 15/1868; G06K 15/1878; G06F 3/1208

See application file for complete search history.

(56) References Cited

U.S. PATENT DOCUMENTS

| | | |
|---|---|---|
| 7,050,196 B1 | 5/2006 | Piatt et al. |
| 8,125,688 B2 | 2/2012 | Watanabe |
| 8,446,633 B2 | 5/2013 | Watanbe |

(Continued)

FOREIGN PATENT DOCUMENTS

| | | |
|---|---|---|
| EP | 1206121 A1 | 5/2002 |
| KR | 20080107243 | 12/2008 |
| WO | WO 2007099554 A2 | 9/2007 |

OTHER PUBLICATIONS

Color Technology for Electronic Imaging Devices, Kang (ed.), Jan. 21, 1997, 10 pages.

(Continued)

*Primary Examiner* — Quang N Vo
(74) *Attorney, Agent, or Firm* — Fish & Richardson P.C.

(57) ABSTRACT

The invention relates to a system for printing on colored background other than black or white, the system comprising: an apparatus for receiving input data respecting an image printable on the colored background, the image constituting one of a color and a grayscale containing transparency information, the apparatus processing the input data and outputting white underbase information including printing ink separation; a dual-acting device capable of acting in a first aspect as a plate making or film generating means in respect of offline printing, and in a second aspect acting as a print controller in respect of online printing; and a printing device selected from a group consisting of offset (Continued)

printing device, screen printing device and Hybrid printing device when offline printing being adapted, and/or, selected from a group comprising inkjet printer, laser printer and toner-based printer when online printing being resorted.

20 Claims, 1 Drawing Sheet

(56) References Cited

U.S. PATENT DOCUMENTS

| | | | |
|---|---|---|---|
| 9,036,227 | B2 | 5/2015 | Maheshwari |
| 11,593,600 | B2 * | 2/2023 | Maheshwari ...... G06K 15/1868 |
| 2003/0189613 | A1 | 10/2003 | Mahy |
| 2009/0207458 | A1 | 8/2009 | Doggett et al. |
| 2010/0177327 | A1 | 7/2010 | Maheshwari |
| 2013/0215440 | A1 | 8/2013 | Chandermohan |
| 2014/0126001 | A1 | 5/2014 | Nudurumati et al. |

OTHER PUBLICATIONS color.org [online], "Image technology colour management—Extensions to architecture, profile format and data structure," 2010, retrieved on Sep. 30, 2021, retrieved from URL<http://www.color.org/icc_specs2.xalter>, 130 pages.

color.org [online], "Image technology colour management—Extensions to architecture, profile format and data structure," 2019, retrieved on Sep. 30, 2021, retrieved from URL<http://www.color.org/icc_specs2.xalter>, 232 pages.

Encyclopedia of Graphics File Formats, 2nd ed., Murray et al. (ed.), May 11, 1996, 5 pages.

International Preliminary Report on Patentability in International Appln. No. PCT/IN2018/050750, dated May 28, 2020, 9 pages.

International Search Report in International Appln. No. PCT/IN2018/050750, dated Feb. 18, 2019, 10 pages.

U.S. Appl. No. 13/818,328, Chandermohan, filed May 3, 2013.

\* cited by examiner

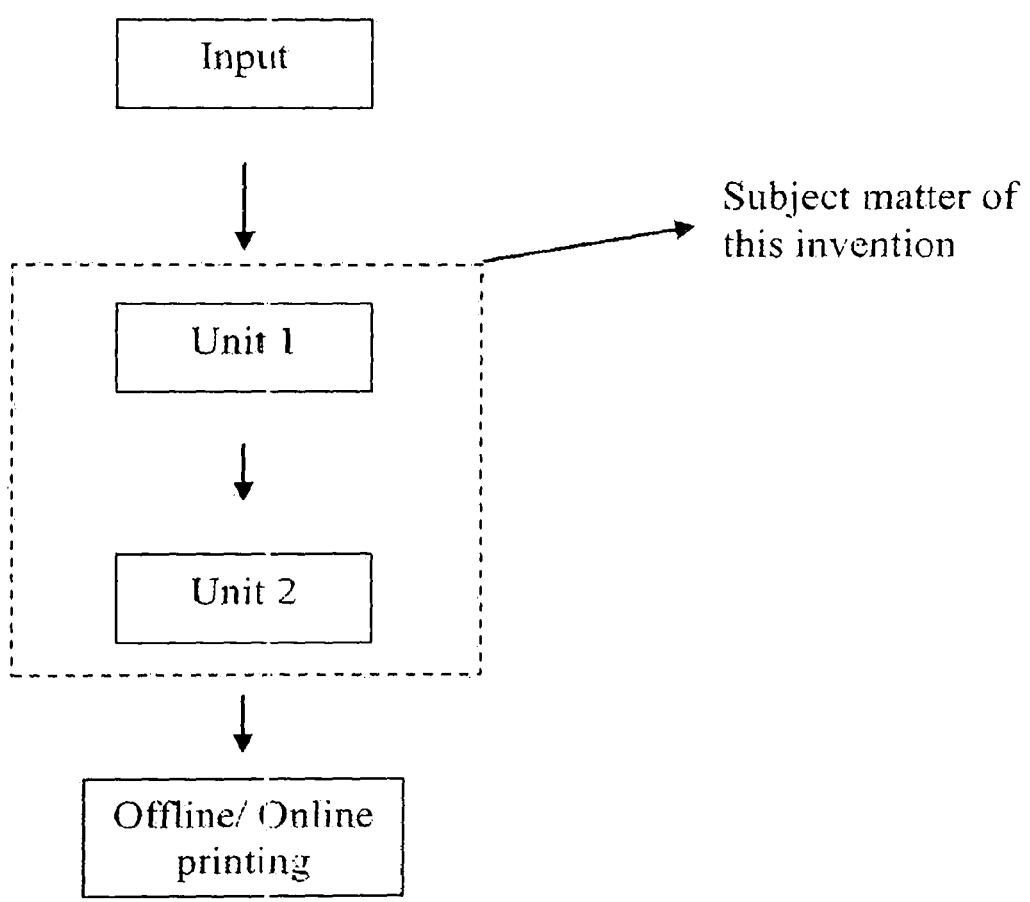

METHOD AND APPARATUS FOR GENERATING WHITE UNDERBASE AND GENERATING MODIFIED SEPARATIONS FOR PRINTING ON COLORED BACKGROUND OTHER THAN BLACK AND WHITE

CROSS-REFERENCE TO RELATED APPLICATIONS

This application is a continuation of U.S. application Ser. No. 16/968,344, now allowed, filed Aug. 7, 2020, which is the United States national phase of International Application No. PCT/IN2018/050750, filed Nov. 14, 2018, and claims priority to Indian Patent Application No. 201721032620, filed Nov. 14, 2017, the disclosures of which are hereby incorporated by reference in their entireties.

FIELD OF THE INVENTION

The invention relates to method and apparatus for generating white underbase and generating modified separations for printing on colored background other than black and white.

BACKGROUND OF THE INVENTION

Since a period of little over last 10 years, digital or direct printing on garment has evolved tremendously with its wide spread use as a method of printing the garments. The methods involve using an inkjet printer employing process color inks along with white ink to hide the background color of the garment for printing an image from its digital representation. A suitable white underbase is printed on the garment as a masking layer to mask the color of the garment over which the color inks are laid down to produce a replica of the image to be printed.

There exist methods to fully automate the generation of white underbase for the colored backgrounds other than white. One of such methods provides for using the color of the background as an optimization [1]. The method achieves this objective by using the color of the background as a virtual ink and not using the corresponding ink during printing, if the virtual ink happens to be a part of the printer primaries inkset. This results in great savings of white ink in the underbase and thereby reducing the costs of the print.

There are other methods used by screen printers traditionally, when the color of the background is any other color than black. Such methods sought to optimize the use of the white ink under any color ink combination in the print using black ink. Such method is also referred for use in digital printing as its subject matter by reference [2]. However, such methods don't take advantage of the ink optimization offered by using the background color of the garment.

Therefore, when the color of the background is black, method described in [1] takes full advantage of the color of the background in reducing the ink amount that goes on the print and thereby reducing the cost of the print. However, when the color of the background is other than black, none of the two methods described above fully optimizes the use of printing inks including white ink. The method described by [1] only takes the advantage of the color of the background by virtually converting the background color into a printing ink but fails to take advantage of savings offered by optimization of white ink for combinations using black ink as used by screen printers in prior art. The method used by screen printers fails to take advantage of the color of the background while only optimizing the use of white ink under black ink combinations.

OBJECT OF THE INVENTION

Therefore, the object of this invention is to provide a method and an apparatus for fully automatic generation of optimized white underbase and printing ink separations taking full advantage of the color of the background and black ink usage in printing combination, on colored backgrounds other than black and white.

SUMMARY OF THE INVENTION

The methods presented by present invention can be used by both digital garment printing and conventional screen-printing apparatus printing on the garments.

In fact, the methods presented here in context of the garment printing are in general applicable to any scenario of printing involving printing on any type of substrate having colored background using a color inkset and white ink.

BRIEF DESCRIPTION OF THE DRAWINGS

FIG. 1 is a diagram showing an apparatus for producing a white underbase

DETAIL DESCRIPTION OF THE INVENTION

According to the present invention the apparatus for producing a white underbase as shown in FIG. 1.

a. Input represents the image that is to be printed on the colored background. This image can be color or grayscale. The image can be vector or bitmap in nature. The image may also contain transparency information for determining what pixels/portion of image to consider for printing and what to be discarded. The transparency information also determines how to combine the pixels/portion of image with the color of the substrate.

[Definition 1—Transparency] The transparency information is the information that indicates how opaque the image is at a particular location. Popular image editing software embed this information as a part of the image. Adobe photoshop from Adobe corporation for example embeds this information with the color data as "layer". This transparency information is generally generated by the designer of the image as a part of his artwork design, so no special effort is required here. The transparency information can also be encoded with the image data in different ways, for example as a special color which is not the part of the image data. Such encoding is permitted by file formats like PNG or GIF[3]. Some graphic image file formats also refer to this information as "alpha" data which can be interpreted same as transparency. Example of such a file format is TGA[3]. The purpose of highlighting different ways of encoding the transparency information with the image data is to illustrate different means of encoding the transparency information along with the image data. The name of the file formats mentioned here are only for the purpose of illustration and by no means excludes those that are not mentioned here but contains transparency information as described by this definition. Any image that does not contain the transparency information explicitly as per this definition is assumed to be fully Non-Transparent or Opaque.

Another term that is used very often in place of transparency is opacity. In fact, Opacity and Transparency are duals of each other and related by a simple equation of Transparency %=100%−Opacity %. Hence throughout this invention the transparency and opacity are the words used as deemed appropriate to illustrate and are related to each other by the preceding equation. Also, Opacity is expressed in % on a scale 0 to 100%, where 0 represents full transparency and 100 represents full opacity and the values between 0 and 100 representing the intermediate states.

b. Unit 1 is where white underbase along with the suitable modified separations is generated automatically from the presented input. This is explained in more detail later.

c. Unit 2 is the plate making device or film generating device if the printing is to be done offline. If the printing is to be done online then this device is the print controller associated with a printing device that generates instructions for printing the corresponding white underbase data and modified color ink separation data generated by unit 1. This reception of information can be instant for an online printing device as it is being generated by unit 1 or can be stored and transmitted later to it. The printing devices controlled by the print controller could be conventional Screen printing devices using plates/screens generated by corresponding separations, digital printing devices and hybrid printing devices (combination of conventional printing device and digital printing device).

d. Offline printing devices such as offset printing or screen-printing machines etc. Online printing devices include devices like inkjet printer, laser printer, toner-based printer etc.

[Definition 2—Online device] For the purpose of this invention we define an online printing device as that device that can make utilization of the white underbase and modified ink separation information generated by unit 1 directly without needing any physical intermediate like plate or screen or film etc. prior for printing.

[Definition 3—Offline device] For the purpose of this invention we define an offline printing device as that device that can make utilization of the white underbase and modified ink separation information generated by unit 1 only with the help of a physical intermediate like plate or screen or film etc. prior for printing.

Hybrid machines mentioned above are combination of offline and online printing devices as they involve both the preparation of screen/plate before printing and can also use the data corresponding to digital part directly without involving any physical screen/plate. However, for the purpose of this invention they are considered as offline devices based on the need to have a screen/plate for printing.

Explanation of Unit 1.

All ink amounts referred are in percentage.

When the background color is other than black and white, following steps are taken to optimize the white ink usage.

Background of the substrate can be converted to an ink by using the white amount in underbase based on the following equation—

BK(background)Color ink=100%−White ink %;

Above equation in alterative form as given in equation (1) can also be used to generate the white ink given the BK color ink amount.

White ink(BK)=100%−BK(background)Color ink    equation (1)

Note that BK (background) color ink is virtual, as it is derived from the background of the substrate. The value of BK (background) color ink can be on normalized scale of 0 to 1, and in that event '1' is used instead of '100' to subtract the BK (background) color ink value in equation (1).

The white ink under the black ink combination can be generated using the following equation—

White ink(K)=100%−Black(K)ink amount equation    (2).

The value of Black (K) color ink can be on normalized scale of 0 to 1, and in that event '1' is used instead of '100' to subtract the Black (K) color ink value in equation (2).

The final white ink to be used in printing can be computed using one of the following "objective" function—

Please note that the input White ink (Bk) and White ink (K) and constant value (CV) in equation (3) are in normalized scale. Thus, the output Final White ink (W) below is in normalized scale and can be converted to percentage by multiplying by 100.

Final White ink(W)=Fn(White ink(Bk),White ink(K))+Constant value(CV)    equation (3).

Where "Objective" Function Fn can be any one of the following depending upon the choice of the implementer.

a. Multiply. The two input values White ink (Bk) and White ink (K) are multiplied by each other and assigned to the output.
  b. Minimum. The minimum of two input values White ink (Bk) and White ink (K) is assigned to the output.
  c. Maximum. The maximum of two input values White ink (Bk) and White ink (K) is assigned to the output.
  d. Average. The average of two input values White ink (Bk) and White ink (K) is assigned to the output.

The White ink (BK) and White ink (K) are computed based on equation (1) and (2) respectively. The output value of the Objective function can be added with a constant value CV before being assigned to the final White ink (W). CV can assume any value between 0 to 1 on normalized scale.

There can be several other practical ways the two values can be combined using one or more combination of the above defined Functions Fn. Such combinations are covered under the scope of this invention as Function Fn itself. Infact, as would be obvious to one skilled in art, more such useful objective functions can be defined that are not defined here. Such functions are based on the spirit of the teachings of present invention and thus covered by the scope and claim of the present invention.

A color table CT can be generated linking an input color to the printing inkset (using physical printer primaries including black (K) ink as well as the virtual background color (BK) ink). If a physical primary that corresponds to the background color exists in the inkset, then this physical ink primary is not included in the final printing inkset. The values of the BK ink and the K ink can then be used to generate corresponding white underbase using equation (1) and (2) and combined white underbase using equation (3). The color table can be implemented either as a function or as multi-dimensional lookup tables or as a combination of both. The structure and implementation of the color table is outside the scope of this invention. For the purpose of this invention the linkage provided by the color table between the input color and printing inkset is the only consideration. The methods to generate a color table based on multi color inkset are well established in literature [4][5].

Following steps are involved to convert an input color (I) into white underbase and equivalent printing ink separations—

Step 1—Split the input color (I) into printer primaries (P)n where n is the number of inks in the printing inkset including the virtual background color (BK) and black (K) ink, based on the color table CT.

Step 2—Compute White ink (Bk) using equation (1).

Step 3—Compute White ink (K) using equation (2).

Step 4—Compute White ink (W) using the objective function (equation 3) taking as inputs the white inks corresponding to BK and K generated in Step 2 and Step 3 respectively.

Step 5—Output the white underbase generated, White ink (W) generated in step 4 along with ink values from (P)n generated in step 1 corresponding to physical ink primaries and ignoring the virtual background color.

Where, Printer Primaries are the inks in the inkset that are used to print on the particular printer. The example of such inkset can be CMYK, CMYKOB etc., where K denotes the black ink. Inkset where K is not present the value of K in the Step 1 is assumed to be 0 (Zero).

Note: The value of Transparency information encoded with the input image color is used to decide whether to completely discard the pixel or how much of it to consider/combine with the printing background. For example, the pixel with 100% transparency is discarded from processing and nothing is printed. The pixel with 0% transparency is fully printed and pixel with 50% transparency is combined in half with the printing background.

The output of step 5 can be used with or without further processing on the substrate, without affecting the usefulness of this invention. The purpose of further processing could be for special effects or for linearization of tonal output etc.

What is the best method to convert the input color value into corresponding printing colors/primaries data is outside the subject matter of this invention as a wide amount of literature is available on this subject. Further how those generated value of printing color primaries including white underbase are to be treated after going through the steps of present invention is also outside the scope of present invention as vast amount of literature is available. See references [4] [5].

There are several variations possible while implementing the steps of the invention. Examples of such possible variations (though not as an exhaustive list) are presented below— a. White underbase values can be pre-computed and saved along with output printing ink values inside the color table that is used to convert an input color into printing primaries. This would be done to speed up the computation of white underbase.

b. Generating white ink (Bk) and White ink (K) as separate layers for various reasons including for additional processing of individual layer data before combining them using one of the objective functions defined by equation (3). These layers can be combined either manually or programmatically (automatic under program control).

All such variations in implementation that are based on the spirit of the present invention are covered by the claims of this invention.

Examples

1. For substrate color 'Gray' having corresponding color value in LAB (37.25, 1.74, 1.2), the following table is output value for various colors using a particular color table CT.

| S No. | Input color (I) in (R, G, B) | Printing primaries (P)n in CMYK and virtual background color BK | White ink (BK) | White ink (K) | Objective function fn( ) used | White underbase value |
|---|---|---|---|---|---|---|
| 1 | (98, 35, 65) | CMYK (0.008, 0.973, 0.333, 0.012), BK (0.820) | 0.18 | 0.988 | Multiply | 0.178 |
| 2 | (188, 107, 156) | CMYK (0.008, 0.596, 0.106, 0.0), BK (0.184) | 0.816 | 1 | Minimum | 0.816 |
| 3 | (184, 11, 155) | CMYK (0.059, 0.784, 0.0, 0.0), BK (0.06) | 0.94 | 1 | Maximum | 1 |
| 4 | (170, 91, 20) | CMYK (0.0, 0.592, 0.973, 0.0), BK (0.4) | 0.6 | 1 | Average | 0.8 |

2. For substrate color 'Red' having corresponding color value in LAB (33.79, 59, 25.6), the following table is output value for various colors using a particular color table CT.

| S No. | Input color (I) in (R, G, B) | Printing primaries (P)n in CMYK and virtual background color BK | White ink (BK) | White ink (K) | Objective function fn( ) used | White underbase value |
|---|---|---|---|---|---|---|
| 1 | (98, 35, 65) | CMYK (0.42, 0.51, 0.08, 0.07), BK (0.863) | 0.137 | 0.97 | Multiply | 0.133 |
| 2 | (188, 107, 156) | CMYK (0.028, 0.533, 0.047, 0.0), BK (0.28) | 0.72 | 1 | Minimum | 0.72 |
| 3 | (184, 11, 155) | CMYK (0.075, 0.773, 0.0, 0.0), BK (0.06) | 0.94 | 1 | Maximum | 1 |

-continued

| S No. | Input color (I) in (R, G, B) | Printing primaries (P)n in CMYK and virtual background color BK | White ink (BK) | White ink (K) | Objective function fn( ) used | White underbase value |
|---|---|---|---|---|---|---|
| 4 | (170, 91, 20) | CMYK (0.047, 0.13, 0.961, 0.004), BK (0.72) | 0.28 | 0.996 | Average | 0.638 |

3. For substrate color 'Blue' having corresponding color value in LAB (29.44, 6.94, −38.15), the following table is output value for various colors using a particular color table CT.

| S No. | Input color (I) in (R, G, B) | Printing primaries (P)n in CMYK and virtual background color BK | White ink (BK) | White ink (K) | Objective function fn( ) used | White underbase value |
|---|---|---|---|---|---|---|
| 1 | (98, 35, 65) | CMYK (0.004, 0.996, 0.573, 0.012), BK (0.6) | 0.4 | 0.988 | Multiply | 0.395 |
| 2 | (188, 107, 156) | CMYK (0.008, 0.62, 0.122, 0.0), BK (0.15) | 0.85 | 1 | Minimum | 0.85 |
| 3 | (184, 11, 155) | CMYK (0.051, 0.784, 0.0, 0.0), BK (0.08) | 0.92 | 1 | Maximum | 1 |
| 4 | (170, 91, 20) | CMYK (0.0, 0.61, 1, 0.0), BK (0.28) | 0.72 | 1 | Average | 0.86 |

Implementation

Such a system can be implemented as an embedded system inside any printing device with a microprocessor or with computing ability or using a computing device or a PDA or an ASIC. The preferred method of implementation is a computer system that can be interfaced with the devices mentioned as a part of unit 2 or work in isolation and interfaced with unit 2 by means of data storage or transmitting devices.

CITED REFERENCES

1. Patent application (WO/2007/099554)—METHOD AND APPARATUS FOR GENERATING WHITE UNDERBASE AND GENERATING SUITABLY MODIFIED SEPARATIONS FOR PRINTING ON COLORED BACKGROUND OTHER THAN WHITE.
2. Print data generating apparatus, printing apparatus, method to generate print data, and computer usable medium therefor—U.S. Pat. No. 8,125,688 B2
3. Encyclopedia of Graphics file formats (Second Edition)—Book by James D. Murray and William VanRyper, published by O'Reilly & Associates Inc.
4. Color Technology for Electronic Imaging Devices—Book by Henry R. Kang, published by SPIE Press. ISBN 0-8194-2108-1
5. ICC file format for color profiles—International color consortium website www.color.org.

I claim:

1. A system for printing on a colored background having a color other than black or white, the system comprising:
an apparatus for receiving input data corresponding to an image printable on the colored background and processing the input data to output ink values, the apparatus configured to:
split an input color (I) into printer primaries (P)n based on a color table, wherein a number of the printer primaries (n) corresponds to a number of inks in a printing inkset that includes a virtual background color ink and a black ink;
compute, based on a value corresponding to an amount of the virtual background color ink, a first value representing a first amount of white ink;
compute, based on a value corresponding to an amount of the black ink, a second value representing a second amount of white ink;
compute, based on the first value and the second value, a third value representing a white underbase ink amount (W); and
output the third value representing the white underbase ink amount (W) and ink values corresponding to amounts of one or more physical inks associated with the printer primaries (P)n.

2. The system of claim 1, further comprising a printing device configured to print a white underbase and the image on the colored background in accordance with the outputted third value representing the white underbase ink amount (W) and the outputted ink values corresponding to the one or more physical inks associated with the printer primaries (P)n,
wherein the printing device is configured to print the white underbase and the image on the colored background without using the virtual ink associated with the virtual background color.

3. The system of claim 2, wherein, for offline printing applications, the printing device is selected from a group comprising an offset printing device, a screen printing device and a hybrid printing device.

4. The system of claim 2, wherein, for online printing applications, the printing device is selected from a group comprising an inkjet printer, a laser printer, and a toner-based printer.

5. The system of claim 2, further comprising a device configured to generate a plate or a film that is used by the printing device to print the white underbase and the image on the colored background.

6. The system of claim 2, further comprising a print controller configured to generate instructions for the printing device to print the white underbase and the image on the colored background.

7. The system of claim 1, wherein the apparatus is further configured to save the third value representing the white underbase ink amount (W) in the color table.

8. The system of claim 2, wherein the image contains transparency information, and wherein the printing device is further configured to print the white underbase and the image on the colored background in accordance with the transparency information contained in the image.

9. The system of claim 1, wherein the image comprises a color image or a grayscale image.

10. The system of claim 1, wherein the apparatus is configured to output the third value representing the white underbase ink amount (W) and the ink values corresponding to the amounts of the one or more physical inks associated with the printer primaries (P)n, without outputting an ink value corresponding to the amount of the virtual background color ink.

11. The system of claim 1, wherein the apparatus is configured to compute the first value representing the first amount of white ink using a parametric relationship of: white ink (1)=100%−BK, wherein "white ink (1)" represents the first value and wherein BK represents the amount of the virtual background color ink.

12. The system of claim 1, wherein the apparatus is configured to compute the second value representing the second amount of white ink using a parametric relationship of: white ink (2)=100%−K, wherein "white ink (2)" represents the second value and wherein K represents the amount of the black ink.

13. The system of claim 1, wherein the apparatus is configured to compute the third value representing the white underbase ink amount (W) using an objective function (Fn) that takes as input the first value and the second value, and outputs the third value, and
wherein the objective function (Fn) comprises an operator that computes at least one of a multiplication of the first value and the second value, a minimum of the first value and the second value, a maximum of the first value and the second value, or an average of the first value and the second value.

14. A method of generating ink values from a given image/color to enable printing on a substrate having a background color other than black and white, the method comprising:

splitting an input color (I) into printer primaries (P)n based on a color table, wherein a number of the printer primaries (n) corresponds to a number of inks in a printing inkset that includes a virtual background color ink and a black ink;

computing, based on a value corresponding to an amount of the virtual background color ink, a first value representing a first amount of white ink;

computing, based on a value corresponding to an amount of the black ink, a second value representing a second amount of white ink;

computing, based on the first value and the second value, a third value representing a white underbase ink amount (W); and outputting the third value representing the white underbase ink amount (W) and ink values corresponding to amounts of one or more physical inks associated with the printer primaries (P)n, without outputting an ink value corresponding to the amount of the virtual background color ink.

15. The method of claim 14, wherein computing the third value representing the white underbase ink amount (W) comprises computing the third value using a given set of data relating to the printing inkset and the printer primaries.

16. The method of claim 14, wherein computing the third value representing the white underbase ink amount (W) comprises using an objective function (Fn) that takes as input the first value and the second value, and outputs the third value, and
wherein the objective function (Fn) comprises an operator that computes at least one of a multiplication of the first value and the second value, a minimum of the first value and the second value, a maximum of the first value and the second value, or an average of the first value and the second value.

17. An article printed using the method of claim 14.

18. The method of claim 14, further comprising saving the third value representing the white underbase ink amount (W) in the color table.

19. The method of claim 14, wherein computing the first value representing the first amount of white ink comprises computing the first value using a parametric relationship of: white ink (1)=100%−BK, wherein "white ink (1)" represents the first value and wherein BK represents the amount of the virtual background color ink.

20. The method of claim 14, wherein computing the second value representing the second amount of white ink comprises computing the second value using a parametric relationship of: white ink (2)=100%−K, wherein "white ink (2)" represents the second value and wherein K represents the amount of the black ink.

* * * * *